Feb. 12, 1952 P. H. RICHARDSON 2,585,842
BRIDGED T PHASE SHIFTER
Original Filed Sept. 22, 1949 3 Sheets-Sheet 1

INVENTOR
P. H. RICHARDSON
BY
*Ralph T. Holcomb*
ATTORNEY

Feb. 12, 1952     P. H. RICHARDSON     2,585,842
BRIDGED T PHASE SHIFTER

Original Filed Sept. 22, 1949     3 Sheets-Sheet 2

INVENTOR
P. H. RICHARDSON
BY
Ralph T. Holcomb
ATTORNEY

Feb. 12, 1952 P. H. RICHARDSON 2,585,842
BRIDGED T PHASE SHIFTER
Original Filed Sept. 22, 1949 3 Sheets-Sheet 3

INVENTOR
P. H. RICHARDSON
BY
Ralph T. Holcomb
ATTORNEY

Patented Feb. 12, 1952

2,585,842

UNITED STATES PATENT OFFICE 2,585,842

BRIDGED T PHASE SHIFTER

Paul H. Richardson, Chatham, N. J., assignor to Bell Telephone Laboratories, Incorporated, New York, N. Y., a corporation of New York Original application September 22, 1949, Serial No. 117,255. Divided and this application September 29, 1950, Serial No. 187,493

23 Claims. (Cl. 178—44)

This invention relates to wave transmission networks and more particularly to variable phase shifters.

An object of the invention is to vary the phase shift of a wave transmission network over a wide range without changing its image impedance.

Another object is to maintain a constant insertion loss at all settings of such a phase shifter.

Other objects are to simplify the circuit and reduce the size and cost of phase shifters of this type.

This is a division of my copending application Serial No. 117,255, filed September 22, 1949.

There is often required a wave transmission network in which the phase shift at a single frequency may be varied without changing the insertion loss or the image impedance. Such a device may be built in the form of a constant-resistance structure but, in order to keep the image impedance constant, both variable inductors and variable capacitors are required.

The variable phase shifter of the present invention has the advantage that only a single type of variable reactor, either a capacitor or an inductor, is required. In the unbalanced form only two variable reactors are required and their reactances are equal at each setting. The circuit is of the bridged-T type. It is derived from a constant-resistance, all-pass, lattice network in which one branch comprises a general reactive impedance and the other branch comprises an equal impedance connected to the remote end of a subsidiary network which has a phase shift of 90 degrees or an odd multiple thereof at the operating frequency $f_0$ and thus effects an inversion of the impedance. The subsidiary network may, for example, be a T or $\pi$ of reactances forming a low-pass or a high-pass filter. In order to provide a wide range of phase shift, in one embodiment the general impedance includes both a capacitor and an inductor, connected either in series or in parallel, one of which is variable. To facilitate the transformation from lattice to bridged-T, one or more additional reactors may be added arbitrarily to the general impedance. By a special procedure the lattice may be transformed into an equivalent bridged-T network in which exactly equal variable reactances appear in both the bridging branch and the shunt branch. Since these variable reactances remain equal at all settings of the phase shifter they may conveniently be arranged for unitary control. In order to maintain the insertion loss substantially constant at all settings, compensating resistors may be added to the bridging and shunt branches.

The nature of the invention will be more fully understood from the following detailed description and by reference to the accompanying drawing, in which like reference characters are used to designate similar or corresponding parts and of which:

Figure 22:
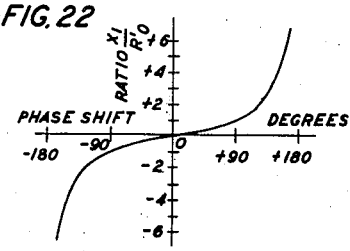
Figure 9:
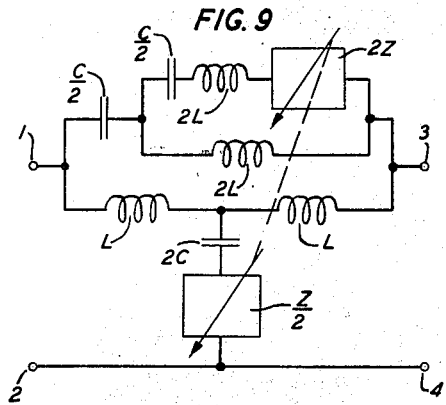
Fig. 9 is a network similar to the one shown in Fig. 8 except that the high-pass filter of Fig. 3 is substituted for the low-pass filter.
Figure 10:
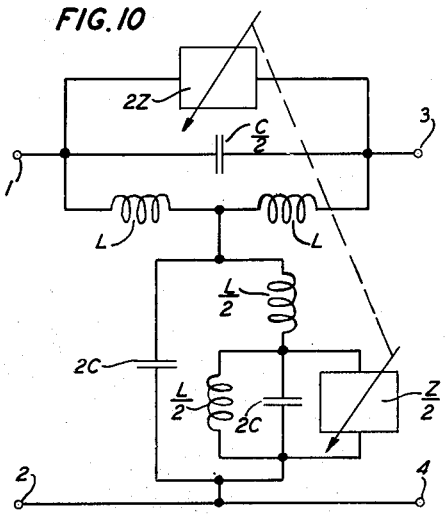
Fig. 10 is a bridged-T network equivalent to the lattice of Fig. 1 when N is a T-type low-pass filter as shown in Fig. 5 and $Z_A$ is the parallel type of Fig. 7.
Figure 11:
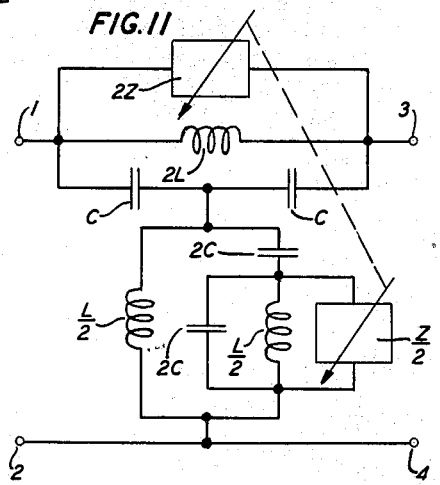
Fig. 11 is a network similar to the one shown in Fig. 10 except that the high-pass filter of Fig. 6 is substituted for the low-pass filter.
Figure 14:
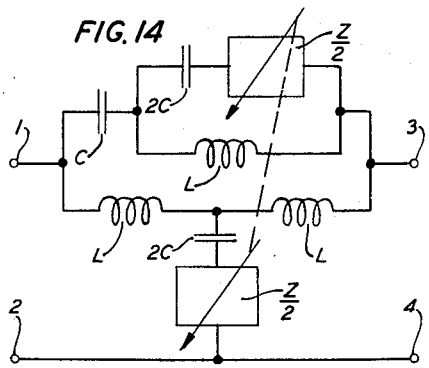
Figure 21:
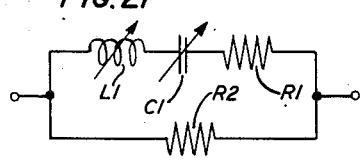
Figure 15:
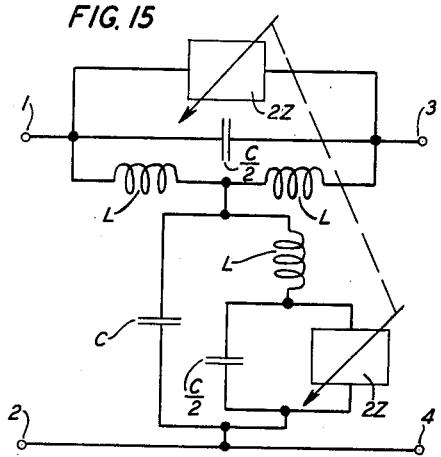
Figure 16:
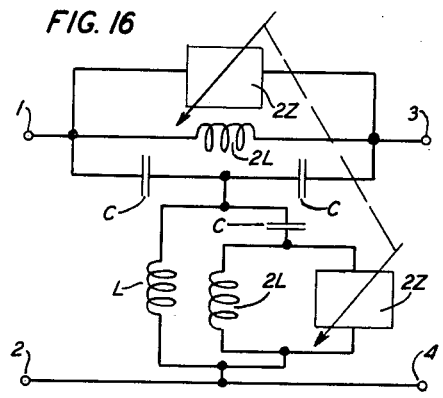

Figs. 14, 15, and 16 are other preferred embodiments derived, respectively, from the circuits shown in Figs. 9, 10, and 11;

Figs. 17, 18, 19, and 20 are specific circuits corresponding, respectively, to those shown in Figs. 13, 14, 15, and 16 when the variable impedance Z is constituted by the series combination of the elements $L_1$, $C_1$, and $R_1$ in parallel with a compensating resistor $R_2$, as shown in Fig. 21; and Fig. 22 is a curve showing how the insertion phase shift of the network is related to the value of the variable reactance.

Figure 1:
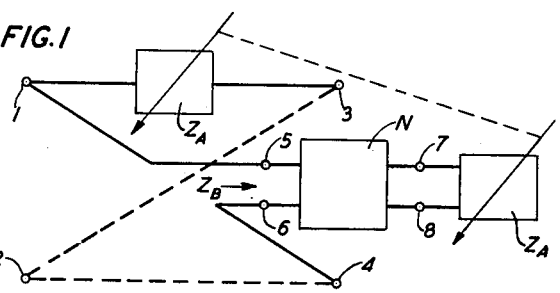
Fig. 1 is a schematic circuit of the prototype constant-resistance lattice network in which the series branch is a general impedance $Z_A$ and the diagonal branch $Z_B$ comprises a second impedance $Z_A$ associated with a subsidiary impedance inverting network N.

Taking up the figures in more detail, Fig. 1 shows schematically the prototype lattice network comprising two equal generalized series impedance branches $Z_A$ and a pair of equal diagonal impedances $Z_B$ connected between a pair of input terminals 1, 2 and a pair of output terminals 3, 4. Only one series branch $Z_A$ and one diagonal impedance $Z_B$ are shown explicitly, the other corresponding branches being indicated by the broken lines connecting the appropriate terminals. A suitable source of alternating electromotive force may be connected to the input terminals and a load or utilization circuit connected to the output terminals.

The impedance $Z_B$ is made up of a reactive four-terminal subsidiary network N connected to the diagonal branch at the terminals 5, 6 and terminated at its output terminals 7, 8 in an impedance $Z_A$ of the same value as the impedance forming the series branch of the lattice. The function of the subsidiary network N is to invert the impedance $Z_A$ with respect to $R_o$, the image impedance of the lattice, and therefore N also has an image impedance equal to $R_o$ and an image phase constant which is equal to an odd multiple of 90 degrees.

If the impedance $Z_A$ is essentially a pure reactance of value $X_A$ the lattice network will operate as a phase shifter having an image impedance $R_o$ and an insertion phase shift $\beta$ given by $$\beta = 2\tan^{-1}\frac{X_A}{R_o} \quad (1)$$

It is seen, therefore, that the phase shift introduced depends upon the reactance of the impedances $Z_A$ and may be varied by adjusting the value of $X_A$. As will be explained below, the effects of parasitic dissipation in the reactive elements forming $Z_A$ can be compensated for to a large extent, so that the insertion loss of the lattice is substantially constant and independent of the value of $X_A$.

Figure 2:
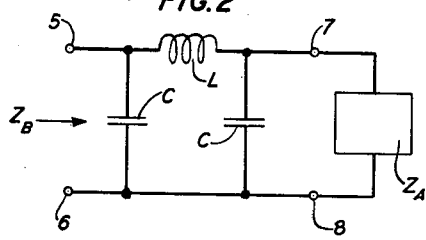
Figs. 2 and 3 show the branch $Z_B$ when the network N is a $\pi$-type low-pass or high-pass filter, respectively.

Fig. 2 shows the configuration of the branch $Z_B$ when the network N is a $\pi$-type low-pass filter comprising a series inductance L with a shunt capacitance C connected at each end thereof. In order for the network N to have an insertion phase shift of 90 degrees at the operating frequency $f_o$ the elements have the following values:

$$C = \frac{1}{2\pi f_o R_o} \text{ farads} \quad (2)$$

$$L = \frac{R_o}{2\pi f_o} \text{ henries} \quad (3)$$

Figure 3:
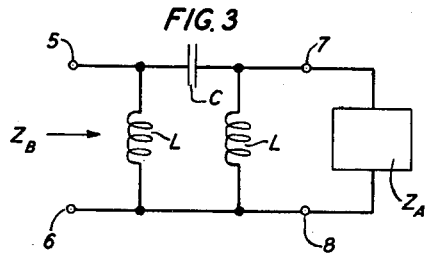

Fig. 3 shows the branch $Z_B$ when N is a $\pi$-type high-pass filter made up of a series capacitance C and two shunt inductances L, the values of which are given by Equations 2 and 3.

Figure 4:
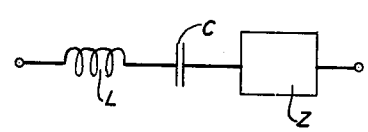
Fig. 4 shows a series type of general impedance $Z_A$ suitable for use with the $\pi$-type networks N of Figs. 2 and 3.

Fig. 4 shows a specific form of the impedance $Z_A$ suitable for use with the $\pi$-type networks of Figs. 2 and 3 to permit the conversion of the prototype lattice of Fig. 1 to a physically realizable equivalent bridged-T network, as explained below. It comprises the series combination of an inductance L, a capacitance C and an impedance Z yet to be determined. The elements C and L have the values given by Equations 2 and 3.

At the operating frequency $f_o$, L and C are resonant so that the impedance of $Z_A$ is equal to Z.

Figure 5:
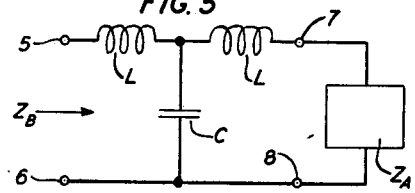
Figs. 5 and 6 show diagonal branches $Z_B$ comprising T-type filters.
Figure 6:
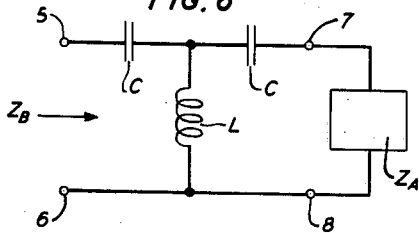

Fig. 5 shows the branch $Z_B$ when N is a T-type low-pass filter made up of two series inductances L and an interposed shunt capacitance C, and Fig. 6 when N is a T-type high-pass filter constituted by two series capacitances C and an interposed shunt inductance L. Here, again, the values of C and L are found from Equations 2 and 3.

Figure 7:
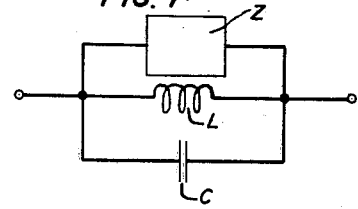
Fig. 7 shows a parallel type of general impedance $Z_A$ suitable for use with the T-type networks N of Figs. 5 and 6.

Fig. 7 shows a specific form for the impedance $Z_A$ suitable for use with the T-type networks of Figs. 5 and 6 to permit the realization of a physical bridged-T network equivalent to the lattice of Fig. 1. It comprises the parallel combination of a capacitance C, an inductance L and an impedance Z. The elements C and L have the values given by Equations 2 and 3.

Figure 8:
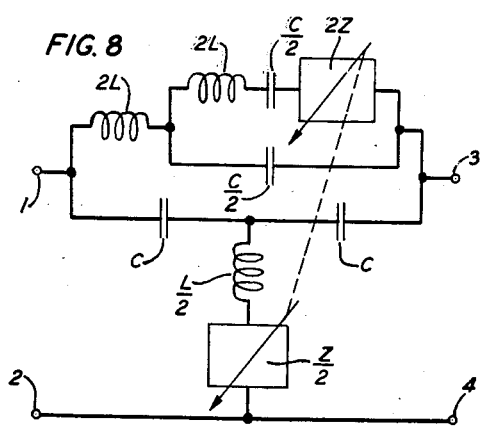
Fig. 8 is a schematic circuit of a bridged-T network equivalent, except for an interchange of branches, to the prototype lattice of Fig. 1 when the subsidiary network N is a $\pi$-type low-pass filter as shown in Fig. 2 and the general impedance $Z_A$ is the series type shown in Fig. 4.

Fig. 8 shows a bridged-T network equivalent to a lattice in which each series branch has the configuration shown in Fig. 2, each diagonal branch is an impedance $Z_A$, and $Z_A$ is of the form shown in Fig. 4. This lattice, it will be recognized, is the same as the one shown in Fig. 1 except that the branches $Z_A$ and the branches $Z_B$ are interchanged. The bridged-T network of Fig. 8 comprises two series capacitances C, an interposed shunt branch made up of an inductance $L/2$ and an impedance $Z/2$ in series, and a bridging branch composed of an inductance $2L$ in series with a capacitance $C/2$, the latter being shunted by the series combination of a second inductance $2L$, a second capacitance $C/2$ and an impedance $2Z$. The impedance from terminal 1 to terminal 3 of the bridged-T is exactly twice that of each series branch of the prototype lattice, and the impedance from terminals 1 and 3 taken together to terminals 2 and 4 is exactly half that of each diagonal branch of the lattice.

Fig. 9 shows another bridged-T network which is equivalent, at the frequency $f_o$, to the circuit of Fig. 8. It is derived from a prototype lattice in which the network N is a high-pass $\pi$-type filter, as shown in Fig. 3, and the impedance $Z_A$ has the form shown in Fig. 4.

Fig. 10 shows an unbalanced bridged-T network which is the equivalent of the prototype lattice of Fig. 1 when the network N is a T-type low-pass filter, as shown in Fig. 5, and the impedance $Z_A$ has the configuration shown in Fig. 7.

The bridged-T network of Fig. 11 is similar to the one shown in Fig. 10 except that it is derived from a prototype lattice in which the network N is a T-type high-pass filter as shown in Fig. 6.

Each of the circuits shown in Figs. 8, 9, 10 and 11 includes an impedance $2Z$ in the bridging branch and an impedance $Z/2$ in the shunt branch. In order to adjust the insertion phase of the network, these impedances are made variable, as indicated by the arrows, and for convenience may be coupled together under a single control, as indicated by the broken line connecting the arrows.

Figure 12:
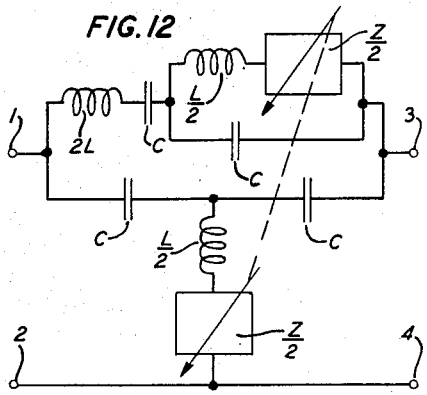
Fig. 12 is a circuit equivalent to the one shown in Fig. 8 after a portion of the bridging branch has undergone an impedance transformation to provide equal variable impedance $Z/2$ in the bridging and shunt branches.

The construction and adjustment of the phase shifter can be further simplified by making the variable impedance in the bridging branch equal to the one in the shunt branch. Fig. 12 shows how the circuit of Fig. 8 may be modified to accomplish this by introducing an impedance transformation into the bridging branch. This involves taking the capacitance $C/2$ out of the upper parallel arm, doubling its value, and placing it on the outside next to the capacitance $2L$. The inductance 2L in the upper arm now becomes L/2 and the impedance 2Z becomes Z/2. In the lower arm, the capacitance C/2 becomes C. In Fig. 12 the two variable impedances Z/2 are now equal at all settings. The circuit of Fig. 12 is the exact equivalent of the one shown in Fig. 8.

Figure 13:
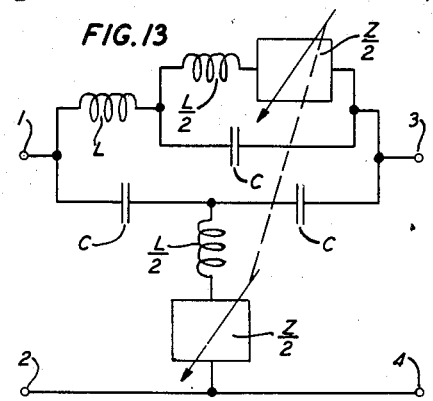
Fig. 13 is a preferred embodiment of the invention, equivalent at the operating frequency $f_0$ to the circuit of Fig. 12, in which one of the capacitors C in the bridging branch has been eliminated.

Fig. 13 shows a further simplification that can be made in the circuit of Fig. 12 by removing the capacitance C next to the inductance 2L and reducing the value of the latter to L. At the operating frequency $f_0$ an inductance L has the same impedance as the series combination of an inductance 2L and a capacitance C. That this is true is apparent from the following considerations. First, divide the inductance 2L into two equal parts, L and L. Now one inductance L will resonate with C at $f_0$ and the combination will have zero reactance. Therefore, C and one of the inductances L may be removed, leaving only the other inductance L, as shown in Fig. 13 which is a preferred embodiment of the invention.

Fig. 14 shows another preferred embodiment obtained from the circuit of Fig. 9 in the same way that Fig. 13 is obtained from Fig. 8.

Figs. 15 and 16 are two other preferred embodiments of the invention obtainable by appropriate transformations of the networks of Figs. 10 and 11, respectively, in a manner analogous to that described above in connection with Figs. 12 and 13. In the circuits of Figs. 15 and 16 the variable impedances in the bridging and shunt branches are equal but each is equal to 2Z instead of Z/2 as in the networks of Figs. 13 and 14. The networks of Figs. 15 and 16 are electrically equivalent to the prototype shown in Fig. 1.

All that remains to be determined is the configuration of the general impedance Z. This may include only a single variable reactance, either an inductance or a capacitance. However, Z preferably comprises an inductance $L_1$ and a capacitance $C_1$ connected in series, as shown in Fig. 21. These preferably resonate at $f_0$ and either or both may be variable. The series resistance $R_1$ represents the effective resistance of the elements $L_1$ and $C_1$ at $f_0$ for an average setting of the adjustable element or elements. The shunting resistance $R_2$ is included to compensate the effect of the resistance $R_1$ and its value is so chosen, as explained below, that the insertion loss of the phase shifter is substantially independent of the setting of the adjustable element.

Figure 17:
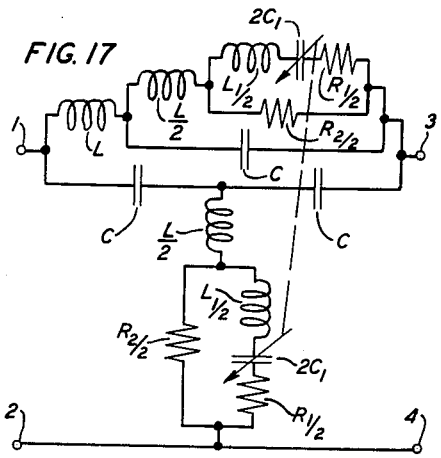
Figure 18:
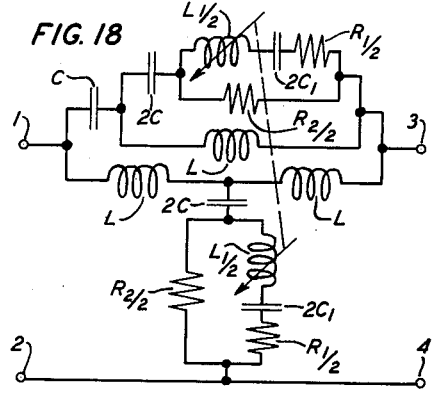

Figs. 17, 18, 19 and 20 show complete phase shifting networks in accordance with the invention corresponding, respectively, to the circuits of Figs. 13, 14, 15 and 16 when the impedance Z has the configuration shown in Fig. 21. In Fig. 17 the variable element in the bridging branch and the variable element in the shunt branch, under unitary control, are the capacitances $2C_1$. In Fig. 18 these elements are the inductances $L_1/2$, in Fig. 19 they are the capacitances $C_1/2$, and in Fig. 20 they are the inductances $2L_1$.

Figure 19:
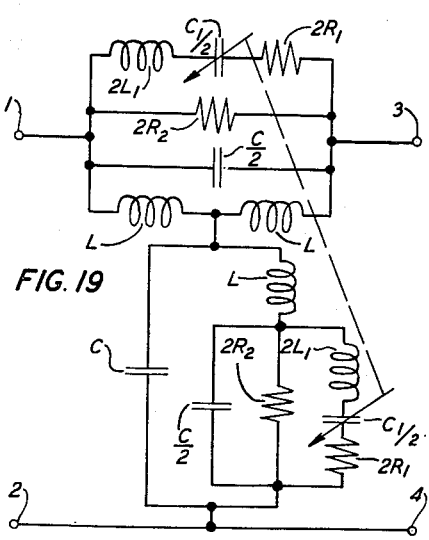
Figure 20:
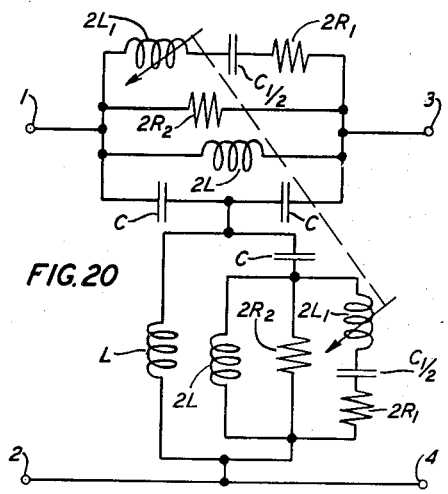

The performance of the phase shifters shown in Figs. 17, 18, 19 and 20, at the operating frequency $f_0$, is best described in terms of the prototype lattice of Fig. 1. As already stated, Figs. 19 and 20 are the equivalent of Fig. 1, and Figs. 17 and 18 are equivalent to Fig. 1 if the series and diagonal branches of the lattice are interchanged.

In Fig. 1 it will be assumed that the network N has a phase shift of 90 degrees, or an odd multiple thereof, at $f_0$, that the impedance $Z_A$ has the configuration shown in Fig. 4 or Fig. 7, and that the impedance Z has the form shown in Fig. 21. Since L and C are resonant in Fig. 4 and antiresonant in Fig. 7, the impedance $Z_A$ will be equal to the impedance Z at $f_0$. Therefore, in Fig. 1, the insertion loss $\alpha$ in nepers and the insertion phase shift $\beta$ in radians are given by the expression $$\epsilon^{\alpha+j\beta} = \frac{R_o + Z}{R_o - Z} \qquad (4)$$

which may also be written in terms of the admittance Y as $$\epsilon^{\alpha+j\beta} = \frac{R_o Y + 1}{R_o Y - 1} \qquad (5)$$

where $$Y = \frac{1}{Z}$$

In the case under consideration $$Y = \frac{1}{R_2} + \frac{1}{R_1 + jX_1} \qquad (7)$$

and $$X_1 = 2\pi f_o L_1 - \frac{1}{2\pi f_o C_1} \qquad (8)$$

so we have the relation $$\epsilon^{\alpha+j\beta} = \frac{\frac{R_o}{R_2} + \frac{R_o}{R_1 + jX_1} + 1}{\frac{R_o}{R_2} + \frac{R_o}{R_1 + jX_1} - 1} \qquad (9)$$

Now, if we set $$\frac{1}{R_1} + \frac{1}{R_2} = \frac{R_2}{R_o^2} \qquad (10)$$

Equation 9 may be written as $$\epsilon^{\alpha+j\beta} = \frac{\left(\frac{R_2}{R_o} + 1\right)\left(\frac{1}{R_o} + j\frac{X_1}{R_1 R_2}\right)}{\left(\frac{R_2}{R_o} - 1\right)\left(\frac{1}{R_o} - j\frac{X_1}{R_1 R_2}\right)} \qquad (11)$$

from which $$\epsilon^{\alpha} = \frac{\frac{R_2}{R_o} + 1}{\frac{R_2}{R_o} - 1} \qquad (12)$$

and $$\beta = 2 \tan^{-1} \frac{X_1 R_o}{R_1 R_2} \qquad (13)$$

It is seen from Equation 12 that the insertion loss is independent of the value of $X_1$ when $R_1$ and $R_2$ satisfy the relationship (10). Therefore, if the effective resistance $R_1$ associated with the elements $C_1$ and $L_1$ does not change with $X_1$ and if the compensating resistance $R_2$ is determined by Equation 10 the loss does not change as the phase shift $\beta$ is varied. In practice it is found that $R_1$ does not change appreciably as $X_1$ is varied, especially if $X_1$ is varied by adjusting the capacitance $C_1$, as in Figs. 17 and 19. To minimize the change in $R_1$ these capacitances are preferably furnished by capacitors having air as the dielectric.

From Equations 13 and 10 the following expression may be derived:

$$\beta = 2 \tan^{-1} \frac{X_1}{R_o'} \qquad (14)$$

where $$R_o' = \frac{R_o}{2}\left(1 + \sqrt{1 + \frac{4R_1^2}{R_o^2}}\right) \qquad (15)$$

It is clear, therefore, that the phase shift $\beta$ can be determined when the reactance $X_1$, the resistance $R_1$ and the image impedance $R_0$ are known. The curve of Fig. 22 shows the phase shift $\beta$ in degrees plotted against the ratio $X_1/R'_0$. If the reference phase is taken as zero when this ratio is zero, it is seen that the phase increases to $+180$ degrees as the ratio increases to plus infinity and decreases to $-180$ degrees as the ratio goes to minus infinity. If a greater phase shift is required, two or more of the phase shifters may be operated in tandem. The total phase shift of the combination will be the sum of the phase shifts of the individual networks, since the networks have a constant resistance image impedance at each end.

As an illustrative example appropriate values for the elements of the phase shifter shown in Fig. 18 will now be worked out. It will be assumed that the image impedance $R_0$ is 100 ohms and that a phase shift range of $\pm 90$ degrees is required. If dissipation in the elements is neglected, it is necessary that the reactance $X_1$ be adjustable from $-100$ ohms to $+100$ ohms. For example, the adjustable inductance $L_1$ as shown in Fig. 21 may have a range of 900 ohms to 1100 ohms at the operating frequency $f_0$ and the capacitance $C_1$ in series therewith will then have a fixed reactance value of 1000 ohms at that frequency. The combination will thus vary from $-100$ ohms to $+100$ ohms as the inductance $L_1$ is adjusted. Now if the effective resistance $R_1$ is 10 ohms, $R'_0$ is found from Equation 15 to be equal to 101 ohms. From Equation 10 the proper value of the compensating resistance $R_2$ is found to be 1010 ohms, in order to make the loss of the network independent of the phase setting. The flat loss $\alpha$ is found from Equation 12 to be 1.73 decibels. Now, when dissipation is taken into account, since $R'_0$ is 101 ohms the reactance change will have to be increased from $\pm 100$ ohms to $\pm 101$ ohms to provide the full $\pm 90$-degree phase shift. In this example the elements of Fig. 18, therefore have the following values:

$$L = \frac{100}{\omega_o} \text{ henries} \quad (16)$$

$$C = \frac{1}{100\omega_o} \text{ farads} \quad (17)$$

$$\frac{L_1}{2} = \frac{1000}{2\omega_o} = \frac{500}{\omega_o} \text{ henries} \quad (18)$$

$$2C_1 = \frac{2}{1000\omega_o} = \frac{1}{500\omega_o} \text{ farads} \quad (19)$$

$$\frac{R_1}{2} = \frac{10}{2} = 5 \text{ ohms} \quad (20)$$

$$\frac{R_2}{2} = \frac{1010}{2} = 505 \text{ ohms} \quad (21)$$

where $\omega_0 = 2\pi f_0$ \quad (22)

and $f_0$ is the operating frequency.

The phase shifter may, of course, be built in any of the other equivalent forms shown in Figs. 17, 19 and 20 and the elements evaluated by applying the simple factors indicated. The choice of structure may be influenced, among other things, by the behavior of the network at frequencies other than the operating frequency $f_0$. The networks shown in Figs. 18 and 20 will pass frequencies below $f_0$ and tend to suppress frequencies above $f_0$, while the reverse is true of the networks of Figs. 17 and 19.

What is claimed is:

1. A variable phase shifter of the bridged-T type comprising two series reactances each of value X at the operating frequency $f_0$, an interposed shunt branch comprising a reactance of value $-X$ at $f_0$ in parallel with an arm comprising a third reactance of value X in series with the parallel combination of a reactance of value $-2X$ and an adjustable reactive impedance of value Z, and a bridging branch comprising a second reactance of value $-2X$ in parallel with a second adjustable reactive impedance of value Z, X being approximately equal in magnitude to the image impedance $R_0$ of the phase shifter.

2. A phase shifter in accordance with claim 1 in which X is inductive.

3. A phase shifter in accordance with claim 1 in which X is capacitive.

4. A phase shifter in accordance with claim 1 which includes two resistances each of value $2R_2$ connected in parallel, respectively, with each of said adjustable reactive impedances, $R_2$ approximately satisfying the relation $$\frac{1}{R_1} + \frac{1}{R_2} = \frac{R_2}{R_o^2}$$

where $R_1$ is the effective resistance of each of said adjustable reactive impedances at said frequency $f_0$.

5. A phase shifter in accordance with claim 1 in which each of said adjustable reactive impedances comprises the series combination of an inductor and a capacitor.

6. A phase shifter in accordance with claim 5 in which said inductor and said capacitor are resonant at approximately the frequency $f_0$ when the phase shifter is set for the mean phase shift of the range.

7. A phase shifter in accordance with claim 1 in which each of said adjustable reactive impedances comprises a variable capacitor.

8. A phase shifter in accordance with claim 7 in which said variable capacitors are under unitary control.

9. A phase shifter in accordance with claim 1 in which each of said adjustable reactive impedances comprises a variable inductor.

10. A phase shifter in accordance with claim 9 in which said variable inductors are under unitary control.

11. A phase shifter in accordance with claim 1 in which said adjustable reactive impedances are substantially duplicates of each other.

12. A variable phase shifter of the bridged-T type comprising two series capacitors each of value C, an interposed shunt branch comprising an inductor of value L in parallel with an arm comprising a third capacitor of value C in series with the parallel combination of an inductor of value 2L and an adjustable reactive impedance of value Z, and a bridging branch comprising a second inductor of value 2L in parallel with a second adjustable reactive impedance of value Z, C and L each having at the operating frequency $f_0$ a reactance which is approximately equal in magnitude to the image impedance $R_0$ of the phase shifter.

13. A phase shifter in accordance with claim 12 in which said adjustable reactive impedances are substantially duplicates of each other.

14. A phase shifter in accordance with claim 12 which includes two resistances each of value $2R_2$ connected in parallel, respectively, with each of said adjustable reactive impedances, $R_2$ approximately satisfying the relation $$\frac{1}{R_1} + \frac{1}{R_2} = \frac{R_2}{R_o^2}$$

where $R_1$ is the effective resistance of each of said adjustable reactive impedances at said frequency $f_0$.

15. A phase shifter in accordance with claim 12 in which each of said adjustable reactive impedances comprises the series combination of an inductor and a capacitor.

16. A phase shifter in accordance with claim 15 in which said last-mentioned inductor and capacitor are resonant at approximately the frequency $f_0$ when the phase shifter is set for the mean phase shift of the range.

17. A phase shifter in accordance with claim 12 in which said adjustable reactive impedances are under unitary control.

18. A variable phase shifter of the bridged-T type comprising two series inductors each of value L, an interposed shunt branch comprising a capacitor of value C in parallel with an arm comprising a third inductor of value L in series with the parallel combination of a capacitor of value C/2 and an adjustable reactive impedance of value Z, and a bridging branch comprising a second capacitor of value C/2 in parallel with a second adjustable reactive impedance of value Z, C and L each having at the operating frequency $f_0$ a reactance which is approximately equal in magnitude to the image impedance $R_0$ of the phase shifter.

19. A phase shifter in accordance with claim 18 in which said adjustable reactive impedances are substantially duplicates of each other.

20. A phase shifter in accordance with claim 18 which includes two resistances each of value $2R_2$ connected in parallel, respectively, with each of said adjustable reactive impedances, $R_2$ approximately satisfying the relation $$\frac{1}{R_1}+\frac{1}{R_2}=\frac{R_2}{R_o^2}$$

where $R_1$ is the effective resistance of each of said adjustable reactive impedances at said frequency $f_0$.

21. A phase shifter in accordance with claim 18 in which each of said adjustable reactive impedances comprises the series combination of an inductor and capacitor.

22. A phase shifter in accordance with claim 21 in which said last-mentioned inductor and capacitor are resonant at approximately the frequency $f_0$ when the phase shifter is set for the mean phase shift of the range.

23. A phase shifter in accordance with claim 18 in which said adjustable reactive impedances are under unitary control.

PAUL H. RICHARDSON.

No references cited.